United States Patent
Aurisset

(10) Patent No.: US 9,319,297 B2
(45) Date of Patent: Apr. 19, 2016

(54) LONG TERM METRICS APPLIED TO MULTIVARIATE TESTING

(71) Applicant: Netflix, Inc., Los Gatos, CA (US)

(72) Inventor: Juliette Aurisset, Menlo Park, CA (US)

(73) Assignee: NETFLIX, Inc., Los Gatos, CA (US)

( * ) Notice: Subject to any disclaimer, the term of this patent is extended or adjusted under 35 U.S.C. 154(b) by 467 days.

(21) Appl. No.: 13/800,558

(22) Filed: Mar. 13, 2013

(65) Prior Publication Data

US 2014/0280862 A1  Sep. 18, 2014

(51) Int. Cl.
  *G06F 15/173*  (2006.01)
  *H04L 12/26*  (2006.01)
  *H04L 12/24*  (2006.01)

(52) U.S. Cl.
  CPC ............ *H04L 43/50* (2013.01); *H04L 41/5067* (2013.01)

(58) Field of Classification Search
  CPC .......................... H04L 41/5067; H04L 43/50
  USPC ......................................................... 709/224
  See application file for complete search history.

(56) References Cited

U.S. PATENT DOCUMENTS

| | | | | |
|---|---|---|---|---|
| 8,160,909 | B2 * | 4/2012 | Voda | G06Q 10/063 705/14.13 |
| 8,296,643 | B1 * | 10/2012 | Vasilik | G06F 17/3089 715/200 |
| 8,473,425 | B1 * | 6/2013 | Maurer | G06Q 10/04 705/14.42 |
| 8,682,712 | B2 * | 3/2014 | Khopkar et al. | 705/14.25 |
| 2006/0162071 | A1 * | 7/2006 | Dixon | G06Q 30/02 5/93.1 |
| 2007/0124192 | A1 * | 5/2007 | Moatti | G06Q 30/02 705/7.29 |
| 2014/0282049 | A1 * | 9/2014 | Lyon | G06F 3/0484 715/744 |
| 2015/0007064 | A1 * | 1/2015 | Givoni | G06F 17/3089 715/760 |
| 2015/0154640 | A1 * | 6/2015 | Qiao | G06Q 30/0261 705/14.58 |

* cited by examiner

*Primary Examiner* — Mohamed Wasel

(74) *Attorney, Agent, or Firm* — Artegis Law Group, LLP

(57) ABSTRACT

A set of variations of a user experience on a subscription-based online site are tested, where each of the set of variations is distinct from other variations in the set of variations. Each of a group of users is assigned to one of the set of variations. For each user request received during a predetermined window of time, one of the set of variations is determined for use in processing the user request, based on a user associated with the user request, and the respective user request is processed using the determined variation. Long-term user metric information relating to subscription services for the subscription-based online site is determined, with respect to the group of users. At least one of the set of variations is then rated based on the determined long-term user metric information.

24 Claims, 10 Drawing Sheets

| TEST CELL ID | 0 | 1 | 2 | 3 | 4 | 5 | 6 | 7 | 8 |
|---|---|---|---|---|---|---|---|---|---|
| SELECT COMPARISON CELL ID | 0 | 0 | 0 | 0 | 0 | 0 | 0 | 0 | 1 |
| # OF ALLOCATIONS | 29,876 | 28,216 | 28,430 | 28,022 | 28,198 | 27,898 | 28,130 | 28,064 | 28,282 |
| P1 RETENTION | 89.2% | 89.7% | 89.3% | 89.7% | 89.2% | 89.5% | 89.7% | 89.5% | 89.4% |
| P-VALUE | 1.000 | 0.052 | 0.918 | 0.064 | 0.994 | 0.262 | 0.109 | 0.373 | 0.148 |
| AVG LTV SCORE | 9.89 | 9.93 | 9.91 | 9.96 | 9.90 | 9.95 | 9.91 | 9.92 | 9.93 |
| P-VALUE | 1.000 | 0.158 | 0.480 | 0.014 | 0.725 | 0.035 | 0.481 | 0.291 | 0.158 |
| MEDIAN HOURS | 29.8 | 29.7 | 29.8 | 30.5 | 29.8 | 30.4 | 29.6 | 30.1 | 30.4 |
| % ALLOCATIONS WITH > 0 PLAY HOURS (OVERALL) | 89.8% | 90.4% | 90.3% | 90.3% | 90.1% | 90.5% | 90.1% | 90.5% | 90.2% |
| P-VALUE | 1.000 | 0.021 | 0.041 | 0.056 | 0.210 | 0.005 | 0.189 | 0.011 | 0.352 |
| % ALLOCATIONS WITH >= 1 HOURS (OVERALL) | 86.5% | 87.1% | 87.0% | 86.9% | 86.7% | 87.2% | 86.9% | 86.9% | 86.8% |
| P-VALUE | 1.000 | 0.038 | 0.063 | 0.128 | 0.529 | 0.016 | 0.112 | 0.111 | 0.265 |
| % ALLOCATIONS WITH >= 5 HOURS (OVERALL) | 77.8% | 78.3% | 78.2% | 78.5% | 77.6% | 78.4% | 77.8% | 78.1% | 78.3% |
| P-VALUE | 1.000 | 0.146 | 0.249 | 0.031 | 0.637 | 0.065 | 0.845 | 0.325 | 0.954 |
| % ALLOCATIONS WITH >= 10 HOURS (OVERALL) | 69.5% | 70.1% | 69.8% | 70.5% | 69.7% | 70.4% | 69.7% | 70.0% | 70.0% |
| P-VALUE | 1.000 | 0.160 | 0.528 | 0.014 | 0.678 | 0.026 | 0.696 | 0.222 | 0.810 |
| % ALLOCATIONS WITH >= 20 HOURS (OVERALL) | 56.6% | 57.0% | 56.5% | 57.6% | 56.7% | 57.3% | 56.9% | 56.9% | 57.1% |
| P-VALUE | 1.000 | 0.353 | 0.775 | 0.013 | 0.750 | 0.101 | 0.445 | 0.557 | 0.889 |
| % ALLOCATIONS WITH >= 40 HOURS (OVERALL) | 38.2% | 38.0% | 38.2% | 38.8% | 38.1% | 38.7% | 37.9% | 38.5% | 38.6% |
| P-VALUE | 1.000 | 0.539 | 0.984 | 0.120 | 0.812 | 0.263 | 0.438 | 0.530 | 0.122 |
| % ALLOCATIONS WITH >= 80 HOURS (OVERALL) | 17.9% | 17.7% | 17.6% | 17.9% | 17.8% | 18.0% | 17.7% | 17.6% | 18.3% |
| P-VALUE | 1.000 | 0.519 | 0.379 | 0.912 | 0.650 | 0.830 | 0.444 | 0.283 | 0.076 |

FIG. 9

LONG TERM METRICS APPLIED TO MULTIVARIATE TESTING

BACKGROUND OF THE INVENTION

1. Field of Invention

Embodiments of the present invention generally relate to A/B testing, and more specifically to techniques for improving the results of an A/B test through the use of stratified sampling.

2. Description of Related Art

Web pages on modern websites, such as websites available on the Internet, are powerful communication tools for disseminating information regarding current events, organizations, and other items of interest to website visitors. Web pages can also provide targeted advertising of products and services. The content of web pages used to convey this information and deliver these advertisements varies considerably. Selections regarding style, graphics, and layout impact visitors' responses to the information offered on the web page, and seemingly small changes in web page appearance can sometimes dramatically change the effect of the web page on visitors. Certain websites generate revenue by way of a subscription model, in which customers periodically pay a fee to renew their subscription to the website. In such a website, selections regarding the style, graphics, and layout of the website, as well as selections of algorithms used by the website, can affect visitors' decisions with respect to their subscriptions or potential subscriptions.

The effectiveness of differing combinations of web page content can be gauged by measuring visitor responses to varying web page content. Through experimentation, effective website content can be identified. One technique for evaluating various website content is through the use of multivariate testing (also referred to herein as "split testing" and "A/B testing"). Generally, in online multivariate testing, different variations of a user experience on a website are tested by presenting each user experience to a respective group of users when the users access the website. For instance, a user experience could be a layout of content on the online website, where each variation represents a distinct arrangement of the content. As another example, a user experience could be a content selection algorithm that is used to select content that is included on a webpage of the website. As yet another example, the user experience could include an online advertisement, a graphic or more generally any component of a webpage that has one or more attributes (e.g., color, size, shape, location, text, etc.,) that can be varied. The different variations could then be presented to users, and the users' actions could be tracked (e.g., using user subscription information such as a login ID, using user IDs generated from the users' browser attributes and possibly other user device attributes, etc.). The captured actions may be used to determine the effectiveness of different variations of the user experience.

SUMMARY OF THE INVENTION

Embodiments provide a method of testing a plurality of variations of a user experience on a subscription-based online site, where each of the plurality of variations is distinct from other variations in the plurality of variations. The method includes assigning each of a plurality of users to one of the plurality of variations of the user experience. Additionally, the method includes, for each of a plurality of user requests received from the plurality of users during a predetermined window of time, determining one of the plurality of variations for use in processing the user request, based on a user associated with the user request, and processing the respective user request using the determined variation. The method also includes determining long-term user metric information relating to subscription services for the subscription-based online site, with respect to the plurality of users, and for each of the plurality of variations.

Other embodiments include, without limitation, a non-transitory computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 is a screenshot illustrating the results of a multivariate test using a projected lifetime value metric, according to one embodiment described herein.

DETAILED DESCRIPTION

Figure 1:
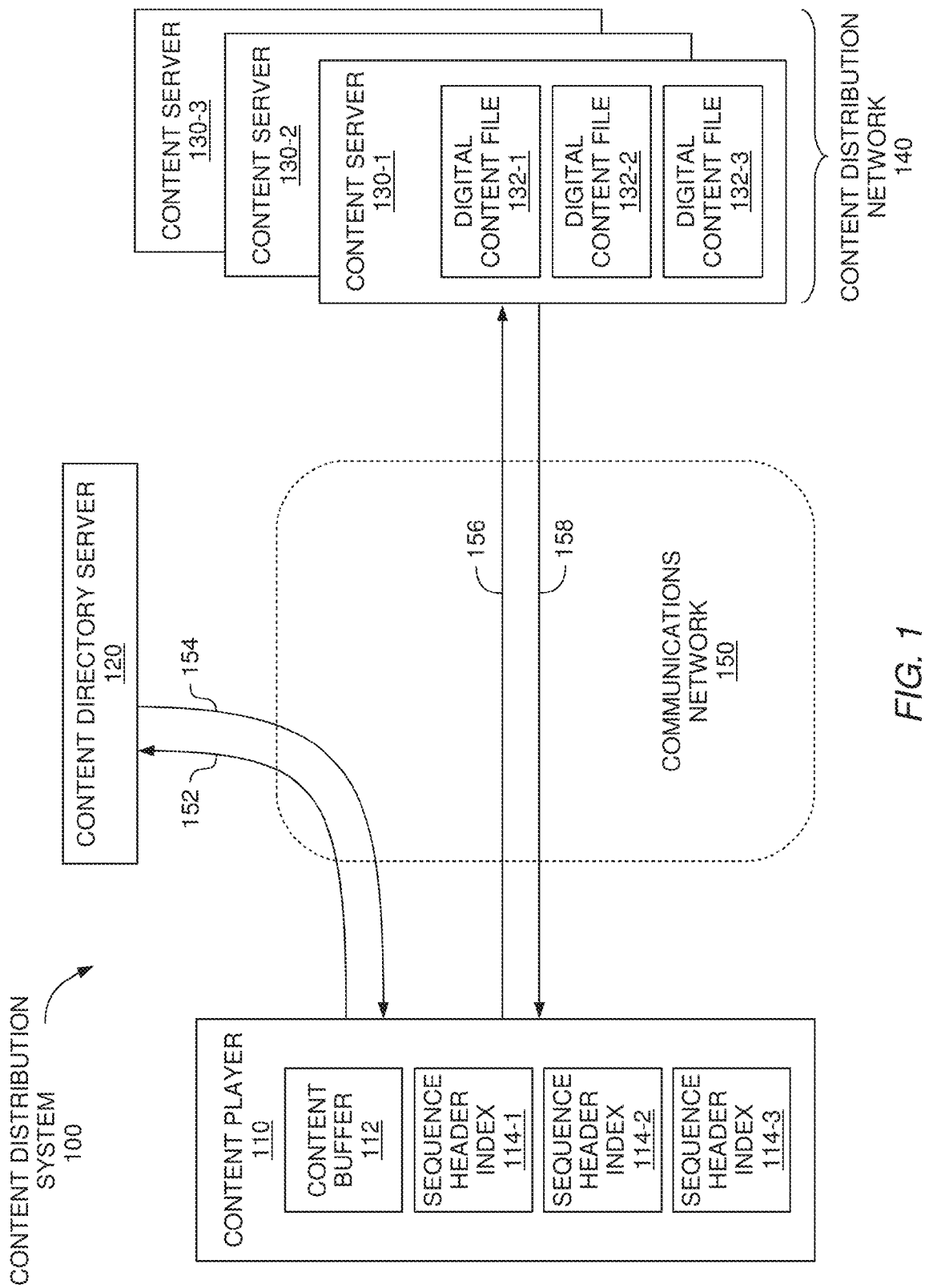
FIG. 1 illustrates a computing infrastructure configured to implement a streaming content service, according to one embodiment described herein.

Generally, multivariate testing for a website involves randomly assigning different variations of a user experience on the website to users, and tracking the users' behavior in order to evaluate the different variations relative to each other. For instance, the variations of the user experience may be assigned to users of the website randomly, in order to ensure that the variations are allocated evenly across all the users in the experimental group. As an example, a user ID associated with a particular user could be used for randomly assigning variations of the user experience to the users. For example, a user ID could be determined for a particular user (e.g., based on the user's login name for the website, based on attributes of the user's browser, etc.) and the user ID could be used to select a variation of the user experience to present to the user. For instance, a hash function could be applied to the user ID and used to select one of a plurality of different variations to present to the user.

The users' behavior could then be monitored and used to evaluate the different variations of the user experience, relative to one another. For instance, some multivariate testing models track user metrics such as a total number of mouse clicks while visiting the website, a measure of average clicks-per-second, a length of time the user visits the website, and so on. These metrics could then be used to evaluate the different variations. For example, in one model, a higher number of total mouse clicks could be viewed as a positive result, as such a result may indicate that the user is more engaged with the website. The different variations of the user experience could then be evaluated using the collected metric data. For instance, if a first one of the variations resulted in a higher number of total mouse clicks while a second one of the variations resulted in a smaller number of total mouse clicks, the first variation could be considered an improvement over the second variation of the user experience.

As with other forms of statistical analysis, the results of a multivariate test involve explaining the variance in the metric data for the different variations of the user experience. Generally speaking, the total variance consists of variance caused by the test experience, variance due to differences in strata and miscellaneous other forms of variance. One challenge in performing a multivariate test is to ascertain the variance caused by the test experience, while minimizing or eliminating other forms of variance in the results. That is, by attempting to isolate the variance caused by the test experience, the test facilitator can more accurately ascertain which of the variations in the user experience was best received by the users.

As an example, assume that a multivariate test is performed using two different variations of a user experience, and that users assigned to the first variation had a higher number of total mouse clicks, relative to the users assigned to the second variation. While generally speaking a higher number of total mouse clicks could indicate that the first variation was better received by users than the second variation, this is not necessarily the case. For instance, assume that users of a certain age group are generally more likely to have a higher number of total mouse clicks, regardless of which variation they are presented with. If substantially more users in the certain age group were assigned to the first variation than the second variation, the abundance of these users could have caused the first variation to receive the higher number of total mouse clicks, rather than the merit of the first variation itself. While techniques exist to estimate the amount of additional variance in the test results, the test results can be said to be less accurate and less meaningful with a higher amount of additional variance.

As such, embodiments provide techniques for reducing the amount of additional variance within the test results of a multivariate test for a plurality of variations of a user experience. A number of stratifications factors could be identified. Generally, the stratification factors represent user characteristics that may influence a metric of the multivariate test. As an example, an age range of users could be a stratification factor, if in a multivariate test measuring a user's total number of mouse clicks, the test provider determines that the age of the user generally influences the user's total number of mouse clicks. As another example, in a multivariate test measuring the retention rate of users for a subscription-based online site, the test provider could determine that the type of client device on which users signed up for their subscription influences the retention rates of the users. As such, the type of client device the users used to subscribe to the online site could be used as a stratification factor in multivariate testing on the online site.

For each permutation of one or more stratification factors that characterize users of the online site, embodiments could generate a respective set of pseudorandom numbers. Embodiments could then assign user requests to variations in the plurality of variations, based on the generated sets of pseudorandom numbers. Embodiments could also track user retention information relating to the user requests, and could use the retention information together with the stratification factors and information about the users to evaluate the plurality of variations. For instance, embodiments could ensure that each of the variations being evaluated is assigned an equal number of users across each permutation of the one or more stratification factors. Advantageously, doing so allows embodiments to minimize variance in the multivariate test results that is not attributable to the test multivariate itself, thereby providing a more accurate and power statistical model for evaluating the different variations.

Section I below describes one example of a subscription-based online site in which embodiments described herein can function. Of course, such an exemplary subscription-based online site is provided for illustrative purposes only, and more generally embodiments can be configured to operate in any environment appropriate for multivariate testing. These techniques for improved multivariate testing through the use of stratified sampling are discussed in more detail in Section II below.

I. Content Streaming Environment

FIG. 1 illustrates a content distribution system 100 configured to implement one or more aspects of the present invention. As shown, the content distribution system 100 includes, without limitation, a content player 110, one or more content servers 130, and a communications network 150. The content distribution system 100 may also include a content directory server 120. In one embodiment, the one or more content servers 130 comprise a content distribution network (CDN) 140.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network. A network connection may broadly refer to a communications channel between two devices that are connected to the communications network 150.

The content directory server 120 comprises a computer system configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110 (e.g., through one or more network connections). Multiple content servers 130 (e.g., content server 130-1, content server 130-2, content server 130-3, etc.) may each have a copy of the digital content file 132 and may each be configured to provide the portions of the file simultaneously to the same content player 110 using the communications network 150.

The content server 130 is a computer system configured to serve download requests for digital content files 132 from the content player 110. The digital content files may reside on a mass storage system accessible to the computer system. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (e.g., a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1, digital content file 132-2, and digital content file 132-3. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. Similarly, digital content file 132-3 may comprise sequence header index 114-3 and an encoded sequence encoded to an average playback bit rate of approximately 1500 Kbps. The 1500 Kbps encoded sequence enables higher quality playback and is therefore more desirable for playback versus the 250 Kbps encoded sequence. Given that multiple content servers 130 (e.g., content server 130-1, content server 130-2, content server 130-3, etc.) may each have a copy of the digital content file 132, each of the multiple content servers 130 may therefore have the digital content file 132-1, digital content file 132-2, and digital content file 132-3, etc.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132. Because variable bit rate encoding may be used, each unit of video data may be variable in size, despite a direct correspondence to the fixed span of playback time. For the above example, while the digital content file 132-1 has an average playback bit rate of approximately 250 kilobits per second (Kbps), one time slot within the digital content file 132-1 could include a unit of video data encoded at 1500 Kbps. In one embodiment, units of audio data are encoded at a fixed bit rate for each time slot and stored in the digital content file 132.

The units of video data and units of audio data are configured to provide time-synchronized playback, beginning at the start of each time slot. To avoid starving either audio playback or video playback, units of audio data and units of video data are downloaded in a generally alternating pattern to assure that the audio buffer 244 and video buffer 246 store comparable durations of playback time each.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to or includes a display device and speaker device for presenting video frames, and generating acoustic output, respectively. As described in greater detail below, the content player 110 is configured to download a unit of video data for a selected bit rate, and adapt the selected bit rate for subsequently downloaded units of video data based on prevailing bandwidth conditions within the communications network 150.

As available bandwidth within the communications network 150 becomes limited, the content player may select a lower bit rate encoding for units of video data that have not yet been downloaded corresponding to subsequent time slots. As available bandwidth increases, a higher bit rate encoding may be selected.

Although, in the above description, the content distribution system 100 is shown with one content player 110 and one CDN 140, persons skilled in the art will recognize that the architecture of FIG. 1 contemplates only an exemplary embodiment of the invention. Other embodiments may include any number of content players 110 and/or CDNs 140. Thus, FIG. 1 is in no way intended to limit the scope of the present invention in any way.

Generally, the content player 110 (or an application executing on the content player 110) may be configured to determine a mapping of the plurality of content servers to a plurality of portions of the content buffer 112, based on network performance information characterizing the streaming performance of the plurality of content servers $130_{1-3}$ (e.g., based on previous digital content streams between the content player and the content servers $130_{1-3}$). For instance, the content player 110 could divide the content buffer 112 into the plurality of portions and, for each of the plurality of portions of the content buffer, could determining a size of the portion based on the retrieved network performance information for the corresponding content server. In one embodiment, the content buffer is divided into portions such that content servers $130_{1-3}$ having a slower network performance, as indicated by the network performance information, are mapped to later portions of the content buffer 112, and content servers with a faster network performance, as indicated by the network performance information, are mapped to earlier portions of the content buffer 112.

Additionally, the content player 110 may transmit a request to each of the plurality of content servers $130_{1-3}$ to transmit digital content associated with the corresponding portion of the content buffer (e.g., a portion of the digital content file 132-1. Doing so allows the content player 110 to stream digital content simultaneously from a plurality of different content servers $130_{1-3}$, which may maximize the network throughput of the streaming and improve the quality of the streaming content (e.g., by streaming a higher quality encoding of the digital content using the increased network throughput). Additionally, by mapping later portions of the content buffer to slower content servers and earlier portions of the content buffer to faster content servers, embodiments may effectively use a variety of different content servers.

Another embodiment provides techniques for optimizing a plurality of parallel network connections for a digital content stream through a network between a plurality of content servers and a content player. In such an embodiment, the content player 110 (or an application executing on the content player 110) may determine an indication of network performance for each of the plurality of parallel network connections. Additionally, the content player 110 could determine whether a first one the plurality of parallel network connections is underperforming, based on whether the indication of network performance associated with the first parallel network connection exceeds a threshold value of performance. Upon determining that the first parallel network connection is underperforming, the content player 110 could drop the first parallel network connection. Additionally, the content player could also be configured to add a new network connection to a content server under certain circumstances. For instance, in one embodiment, the content player 110 is configured to add a new network connection upon determining that a total network throughput is less than a threshold amount of throughput. Advantageously, doing so helps to optimize the number of parallel network connections used by the content player for streaming digital content.

Figure 2:
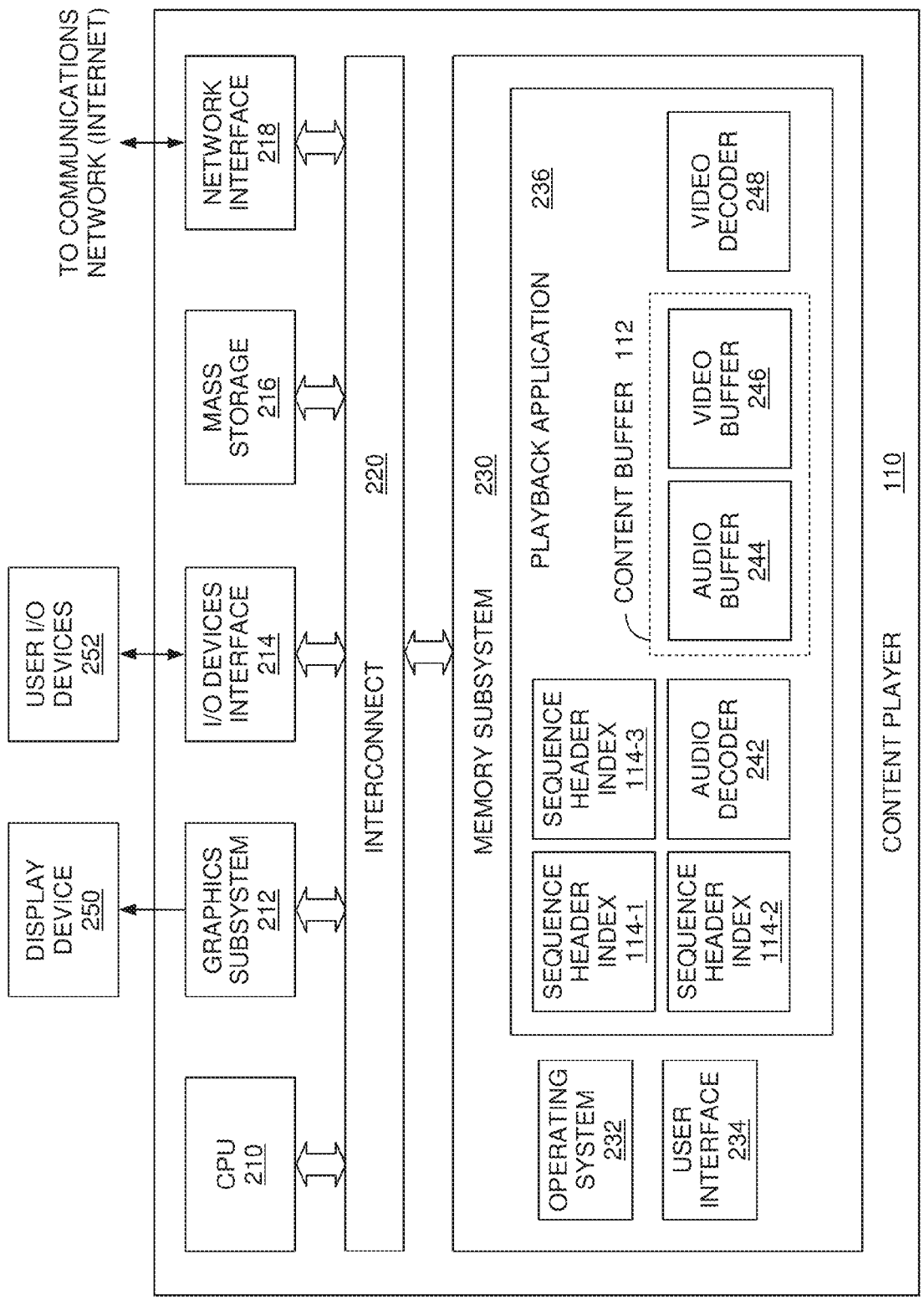
FIG. 2 illustrates a content player configured with a playback application, according to one embodiment described herein.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system 232, user interface 234, and playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file 132 from one or more of the content servers 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content files 132 associated with the requested title, the playback application 236 downloads sequence header indices 114 associated with each digital content file 132 associated with the requested title from the content server 130.

In one embodiment, the playback application 236 begins downloading the digital content file 132 associated with the requested title comprising the encoded sequence encoded to the lowest playback bit rate to minimize startup time for playback. For the purposes of discussion, the digital content file 132-1 is associated with the requested title and comprises the encoded sequence encoded to the lowest playback bit rate. The requested digital content file 132-1 is downloaded into the content buffer 112, configured to serve as a first-in, first-out queue. In one embodiment, each unit of downloaded data comprises a unit of video data or a unit of audio data. As units of video data associated with the requested digital content file 132-1 are downloaded to the content player 110, the units of video data are pushed into the content buffer 112. Similarly, as units of audio data associated with the requested digital content file 132-1 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

When playback is initiated, the playback application 236 requests units of video data encoded to the lowest available bit rate, thereby minimizing start time perceived by a user. However, as bandwidth conditions within the communications network 150 allow, the playback application 236 may request units of video data encoded to higher bit rates, thereby improving playback quality over time, without introducing a startup delay commensurate with the highest level of playback quality ultimately achieved by the playback application 236. If bandwidth conditions within the communications network 150 deteriorate during playback, then the playback application 236 may request subsequent units of video data encoded to a lower bit rate. In one embodiment, the playback application 236 determines which encoded bit rate should be used for each sequential download of a unit of video data based on a bandwidth estimate calculated over one or more recently downloaded units of video data.

Figure 3:
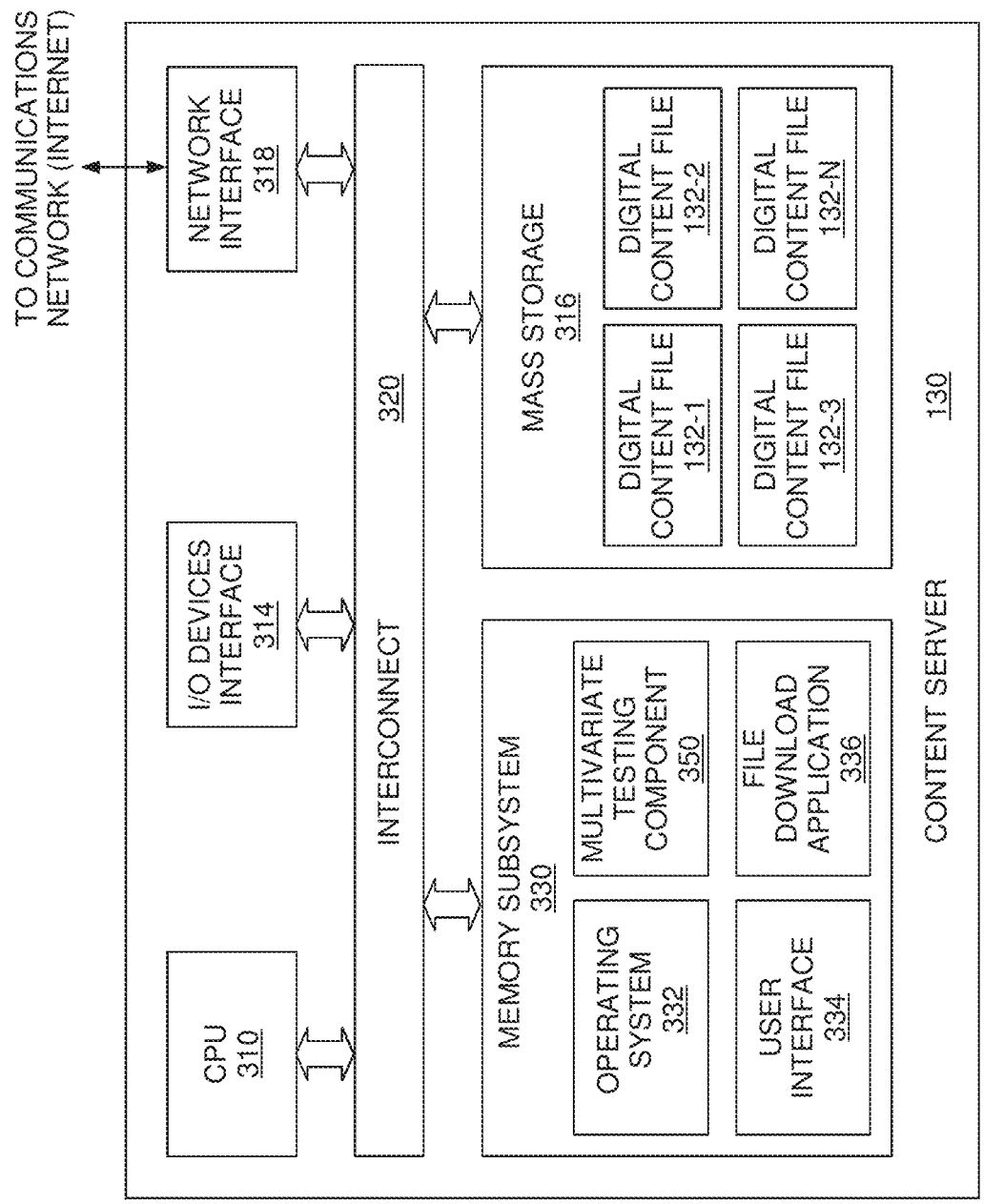
FIG. 3 illustrates a content server configured with a file download application, according to one embodiment described herein.

FIG. 3 is a more detailed view of the content server 130 of FIG. 1, according to one embodiment of the invention. The content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an operating system 332, a user interface 334, a file download application 336 and a multivariate testing component 350. The operating system 332 performs system management functions such as managing hardware devices including the network interface 318, mass storage unit 316, and I/O devices interface 314. The operating system 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various operating systems and user interfaces that are well-known in the art and suitable for incorporation into the content player 130. Generally, the multivariate testing component 350 is configured to perform multivariate testing on different variations of a user experience on the content streaming system. These techniques for improved multivariate testing are discussed in more detail below in Section II.

The file download application 336 is configured to facilitate the transmission of digital content files 132-1 to 132-N, to the content player 110, via a file download operation or set of operations. The downloaded digital content file 132 is transmitted through network interface 318 to the content player 110 via the communications network 150. In one embodiment, file contents of each digital content file 132 may be accessed in an arbitrary sequence. As described, each digital content file 132 includes a sequence header index 114 and an encoded sequence. An encoded sequence provides a full version of digital media content (e.g., video or audio data), encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

II. Long Term Metrics Applied to Multivariate Testing

As discussed above, embodiments described herein provide techniques for testing a plurality of variations of a user experience, where each of the plurality of variations is distinct from other variations in the plurality of variations. Generally, a user experience represents any entity that can be evaluated through the use of multivariate testing. Examples of such a user experience include images, animations, audio, layouts, algorithms, and so on. For example, multivariate testing could be used to evaluate different variations of a company's logo on an online website. As another example, multivariate testing could be used to evaluate different content selection algorithms on an online content streaming site.

In some embodiments, multivariate testing can be used to evaluate multiple variations of multiple user experiences. An example of this is shown in FIGS. 4A-D, which illustrate different variations of a user experience, according to one embodiment described herein. In the examples shown in FIGS. 4A-D, two different user experiences are being evaluated: two different variations of a logo for an online site, and two different variations of a search algorithm for the online site.

Figure 4A:
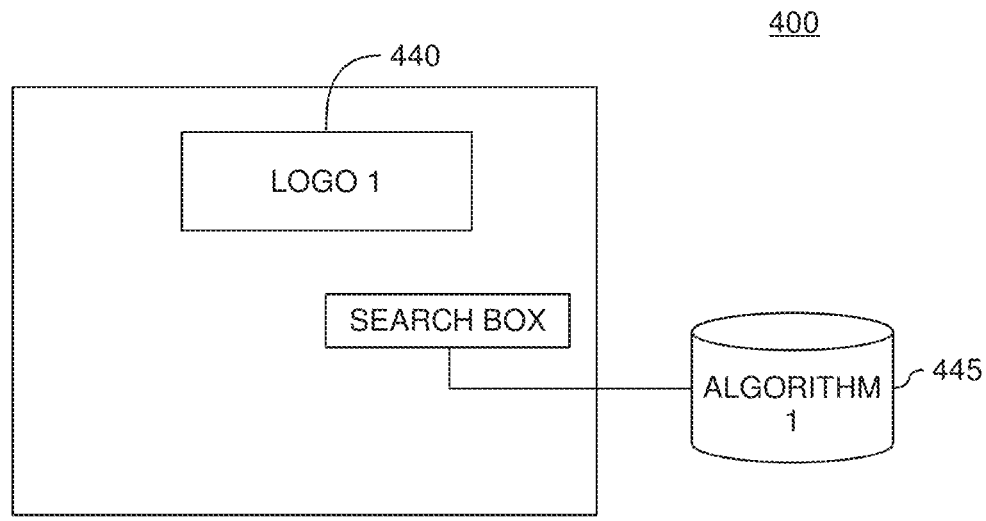
FIGS. 4A-D illustrate different variations of a user experience, according to one embodiment described herein.
Figure 4B:
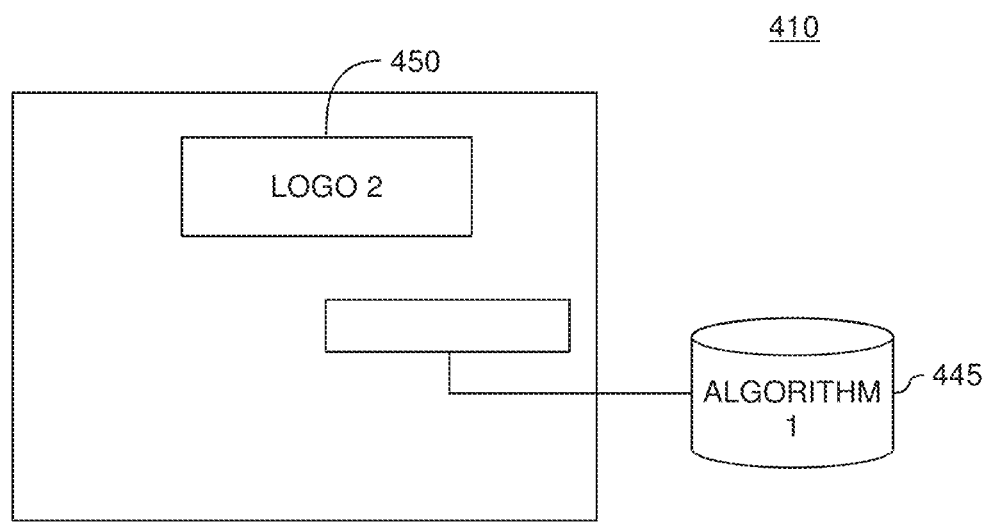
Figure 4C:
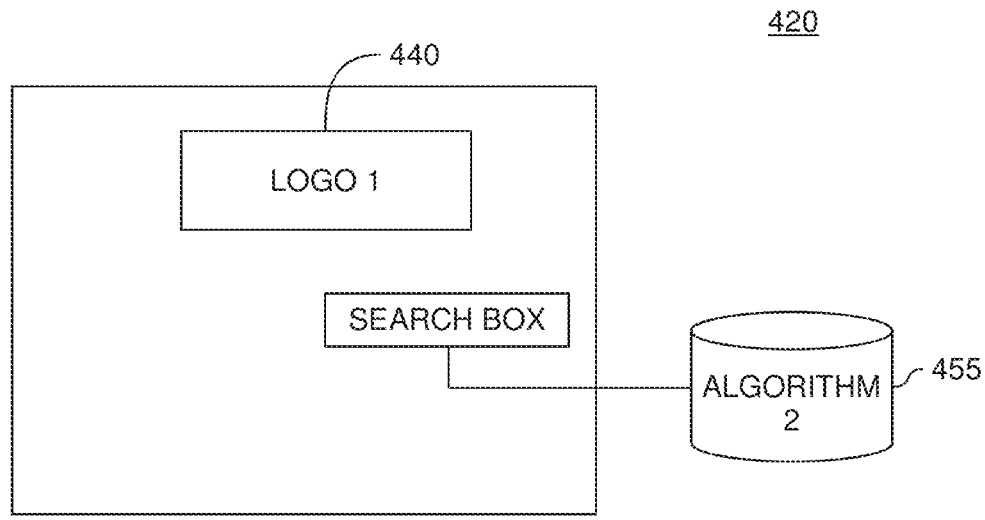
Figure 4D:
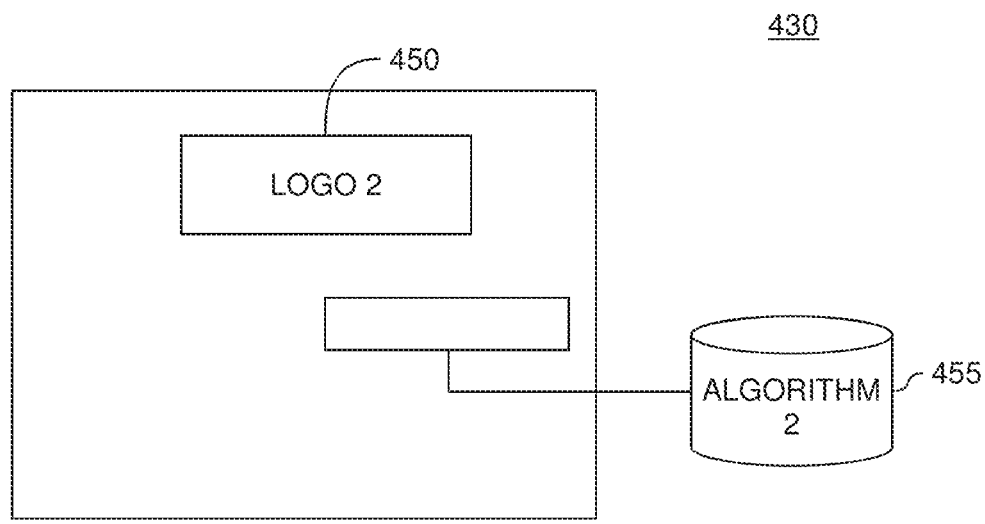

As shown, the FIG. 4A is a screenshot of an interface 400 for an online site. The interface 400 includes a first logo 440 and a search box that is tied to a first search algorithm 445. FIG. 4B illustrates a second variation of the online site. That is, the FIG. 4B illustrates an interface 410 that includes the search box that is tied to the first search algorithm, but also includes a second logo 450 for the online site. Similarly, in FIG. 4C, the interface 420 includes the first logo 440, but includes a search box tied to a second search algorithm 455. Finally, the FIG. 4D illustrates yet another variation, where the interface 430 includes the second logo 450 and the second search algorithm 455.

Generally, for a multivariate test involving the interfaces 400, 410, 420 and 430, users visiting the online site will be shown one of these different variations. For example, a particular user visiting the online site could be presented with the interface 400, while a different user could be presented with the interface 410. User information associated with the tested users could be monitored and then used to evaluate the different interfaces 400, 410, 420 and 430. For example, a particular multivariate test could track retention information for the users of a subscription-based online site (i.e., whether the users maintained their subscriptions at the end of the multivariate test), and the variation associated with the highest retention rate could be selected as the best variation for the online site.

As discussed above, by tracking a long-term metric such as retention information, embodiments may improve multivariate testing for use in subscription-based online sites. Generally, embodiments provide techniques for testing a plurality of variations of a user experience on a subscription-based online site, where each of the plurality of variations is distinct from other variations in the plurality of variations. For instance, a multivariate testing component 350 could assign each of a plurality of users to one of the plurality of variations of the user experience. While generally it may be preferable to equally distribute the users amongst the plurality of variations, it is broadly contemplated that any number of different techniques may be used to assign the users to the different variations, consistent with the functionality described herein.

For each of a plurality of user requests received from the plurality of users during a predetermined window of time, the multivariate testing component 350 could determine one of the plurality of variations for use in processing the user request, based on a user associated with the user request, and could process the received user request using the determined variation. That is, once the multivariate testing component 350 has assigned a user to a particular one of the variations, the multivariate testing component 350 could then process requests from the user received during a predetermined time window associated with the multivariate test using the assigned variation. For example, once a particular user is assigned to a given one of the variations, the multivariate testing component 350 could repeatedly present the user with the assigned variation, each time the particular user accesses subscription-based online site.

Generally, the multivariate testing component 350 can be configured to perform a particular multivariate test for a predetermined window time of time (e.g., 4 months). Once the predetermined window of time has elapsed, the multivariate testing component 350 could determine long-term user metric information relating to subscription services for the subscription-based online site, with respect to the plurality of users, and for each of the plurality of variations. For example, the multivariate testing component 350 could calculate a rate of retention for each of the plurality of variations, based on which users assigned to the variations remained subscribers of the subscription-based online site at the end of the test window of time. In one embodiment, the multivariate testing component 350 could also consider whether users upgraded (or downgraded) their subscription to the online site, in calculating the retention rate for each variation.

The multivariate testing component 350 could then use the determined long-term user metric information to rate each of the plurality of variations, relative to one another. For example, a particular variation could be rated more positively if users assigned to the particular variation had a higher rate of retention (e.g., more users remained subscribers and/or upgraded their subscriptions by the end of the multivariate test), relative to users assigned to other variations. As another example, if the multivariate testing component 350 determines users assigned to a second variation exhibited a lower rate of retention at the end of the multivariate test, the multivariate testing component 350 could rate the second variation with a more negative rating, relative to the first variation.

Figure 5:
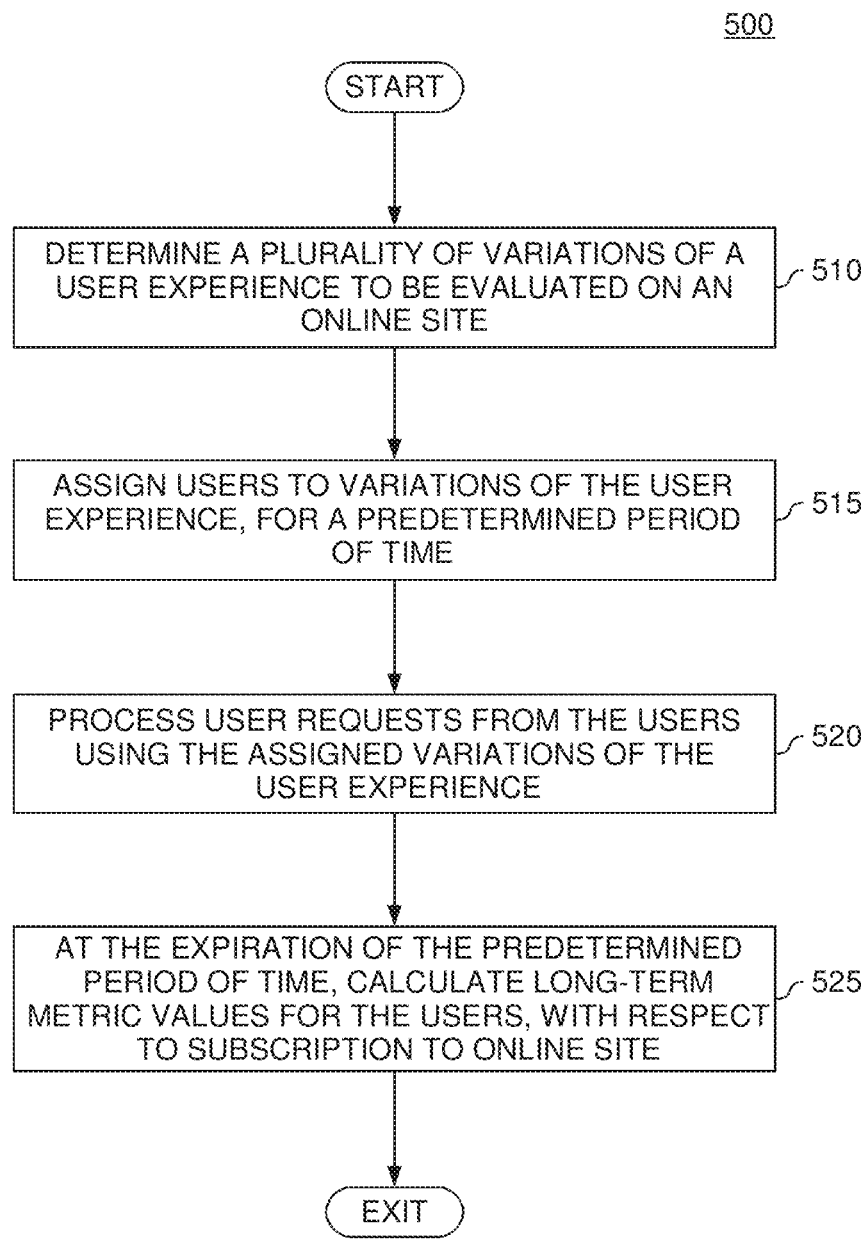
FIG. 5 is a flow diagram illustrating a method for using multivariate testing to evaluate long-term user metrics, according to one embodiment described herein.

An example of such an embodiment is shown in FIG. 5, which is a flow diagram illustrating a method for using multivariate testing to evaluate long-term user metrics, according to one embodiment described herein. As shown, the method 500 begins at block 510, where the multivariate testing component 350 determines a plurality of variations of a user experience on an online site to be evaluated. As discussed above, the plurality of variations can relate to a number of different elements of the online site. Examples of these elements include, without limitation, images, animations, layouts (e.g., arrangements of content on an interface of the online site), audio effects, algorithms (e.g., content selection algorithms for an interface of a content streaming service), and so on. For instance, a first variation could use a first content selection algorithm for presenting content in an interface, while a second variation could use a different content selection algorithm for selecting content for display.

In performing the multivariate test, a single element (e.g., a layout of an interface on the online site) could be selected, and a number of different variations of the single element could be determined by the multivariate testing component 350. In one embodiment, the multivariate testing component 350 is configured to determine the plurality of variations by identifying a plurality of elements of the online site to evaluate, and by generating the plurality of variations based on the plurality of variables, where each of the plurality of variations comprises a distinct permutation of the variables in the plurality of variables.

Once the plurality of variations are determined, the multivariate testing component 350 assigns users included in the multivariate test to the plurality of variations (block 515). In one embodiment, the multivariate testing component 350 could assign each of the users of the online site to one of the plurality of variations. In a particular embodiment, the multivariate testing component 350 is configured to select a subset of the users of the online site for inclusion in the multivariate test, and to assign only the subset of the users to the plurality of variations. For instance, the multivariate testing component 350 could allow users to volunteer for participation in the multivariate test, and could only assign those users who volunteer to one of the plurality of variations. Generally speaking, however, it is preferable to select the subset of users without soliciting volunteers, as the popular of users who volunteer to test new user experiences may not be representative of the user base as a whole.

The multivariate testing component 350 then processes user requests received from the plurality of users, using the assigned variations (block 520). For example, assume that the multivariate testing component 350 is performing a multivariate test to evaluate different content selections algorithms for a content streaming server (e.g., content server 130). In such an example, one of the users could access a content streaming server (e.g., content server 130) using a client device (e.g., content player 110), and the multivariate testing component 350 could determine which variation (i.e., which of the multiple content selection algorithms being evaluated) the user has been assigned to. The multivariate testing component 350 could then generate an interface for the user (e.g., a web page configured to use the content selection algorithm to which the user is assigned), and could return the generated interface in response to the user request.

The multivariate testing component 350 then calculates long-term metric values for the plurality of users involved in the test (block 525), and the method 500 ends. For example, the multivariate testing component 350 could calculate retention information for each of the plurality of users, based on whether each of the plurality of users remains a subscriber to the subscription-based online site at the end of the period of time. Such long-term metric information could then be used to evaluate the plurality of variations, relative to one another.

For instance, a variation whose users exhibited higher retention rates could be deemed to be an improvement, over a variation whose users exhibited a lower retention rate. In one embodiment, the multivariate testing component 350 is configured to compute the long-term metric values for the plurality of users involved in the test, at the expiration of the predetermined period of time. However, more generally, the multivariate testing component 350 may compute the long-term metric values at any point in time during the test, using projected lifetime value information for the users.

Figure 6:
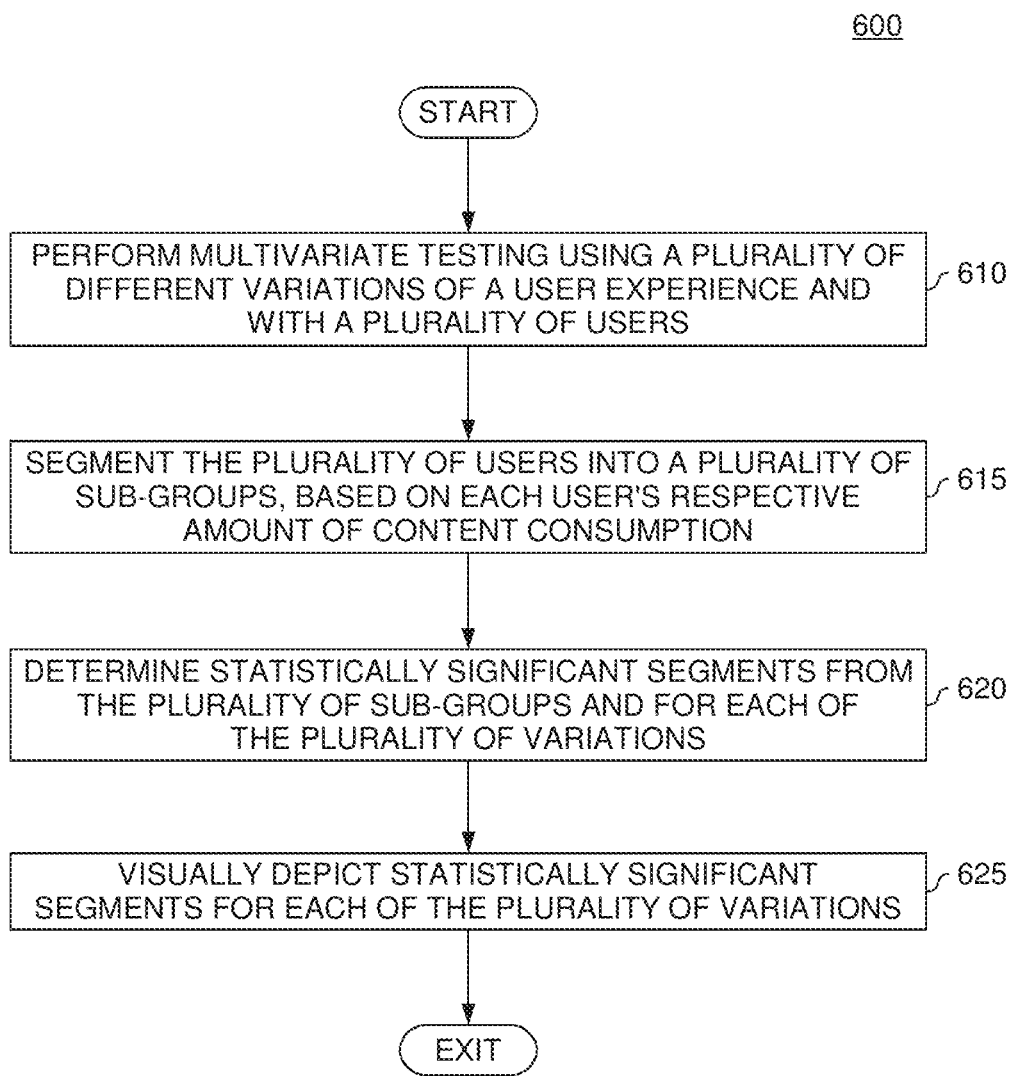
FIG. 6 is a flow diagram illustrating a method for analyzing multivariate testing results, according to one embodiment described herein.

In one embodiment, the multivariate testing component 350 is configured to segment the users into subgroups for use in analyzing the results of the multivariate test. An example of such an embodiment is shown in FIG. 6, which is a flow diagram illustrating a method for analyzing multivariate testing results, according to one embodiment described herein. As shown, the method 600 begins at block 610, where the multivariate testing component 350 performs multivariate testing using a plurality of different variations of a user experience and using a plurality of users. For example, the multivariate testing component 350 could perform the multivariate testing using the method 500 discussed above.

Returning to the depicted example, the multivariate testing component 350 then segments the users involved in the test into a plurality of sub-groups, based on each user's respective amount of content consumption (block 615). For example, for a test involving an online content streaming service, the multivariate testing component 350 could divide the users into sub-groups based on an average daily amount of streaming content the users watched during the testing time period. Of note, while the depicted embodiment segments users based on their content consumption, it is broadly contemplated that users could be divided into sub-groups based on any number of other factors with some correlative relationship to user retention and/or projected lifetime value of the users (e.g., total mouse clicks per session, average ratings given to content on the online site by the users, etc.).

The multivariate testing component 350 then identifies one or more statistically significant sub-groups of users, with respect to the results of the multivariate testing and across the plurality of variations (block 620). For example, the multivariate testing component 350 could segment the users based on an amount of streaming content the users consumed within the tested window of time. For instance, the segments could include users who watched more than 0 hours of streaming content, users who watched over 1 hour of content, users who watched over 5 hours of content, users who watched over 10 hours of content, and so on. In such an embodiment, a user may belong to one segment (e.g., a user who watched more than 0 hours of content, but less than 1 hour of content), multiple segments (e.g., a user who watched 13 hours of content) or no segments at all (e.g., a user who did not watch any content). The multivariate testing component 350 could determine what percentage of users fall within each of the segments, for each of the variations and the set of users assigned to the respective variation.

Once the segments are created and the corresponding percentages determined, the multivariate testing component 350 could calculate a respective p-value for each of the percentages calculated for each of the variations. Generally, the p-value is indicative of a probability of obtaining a percentage for the corresponding segment at least as high as the determined percentage, assuming no difference between the variations. The multivariate testing component 350 could then determine one or more statistically significant percentages, by determining which percentage values are greater than their corresponding baseline percentage value and that have a p-value less than a predetermined threshold amount (e.g., 0.05).

For example, one of the plurality of variations could be used as a baseline user experience, and the multivariate testing component 350 could compare percentages calculated for other variations in the plurality of variations to the percentages calculated for the baseline user experience, to identify percentages for the other variations that are greater than the corresponding percentage for the baseline user experience. These identified percentages could then be restricted to only include percentage values whose p-value is less than the predetermined threshold amount. Advantageously, doing so allows the multivariate testing component 350 to identify variations where content consumption has increased (relative to the baseline user experience), and where the increase in content consumption is likely due to the variation itself (i.e., due to the p-value being less than the threshold amount). The multivariate testing component 350 then displays the one or more statistically significant sub-groups (block 625), and the method 600 ends.

Figure 7:
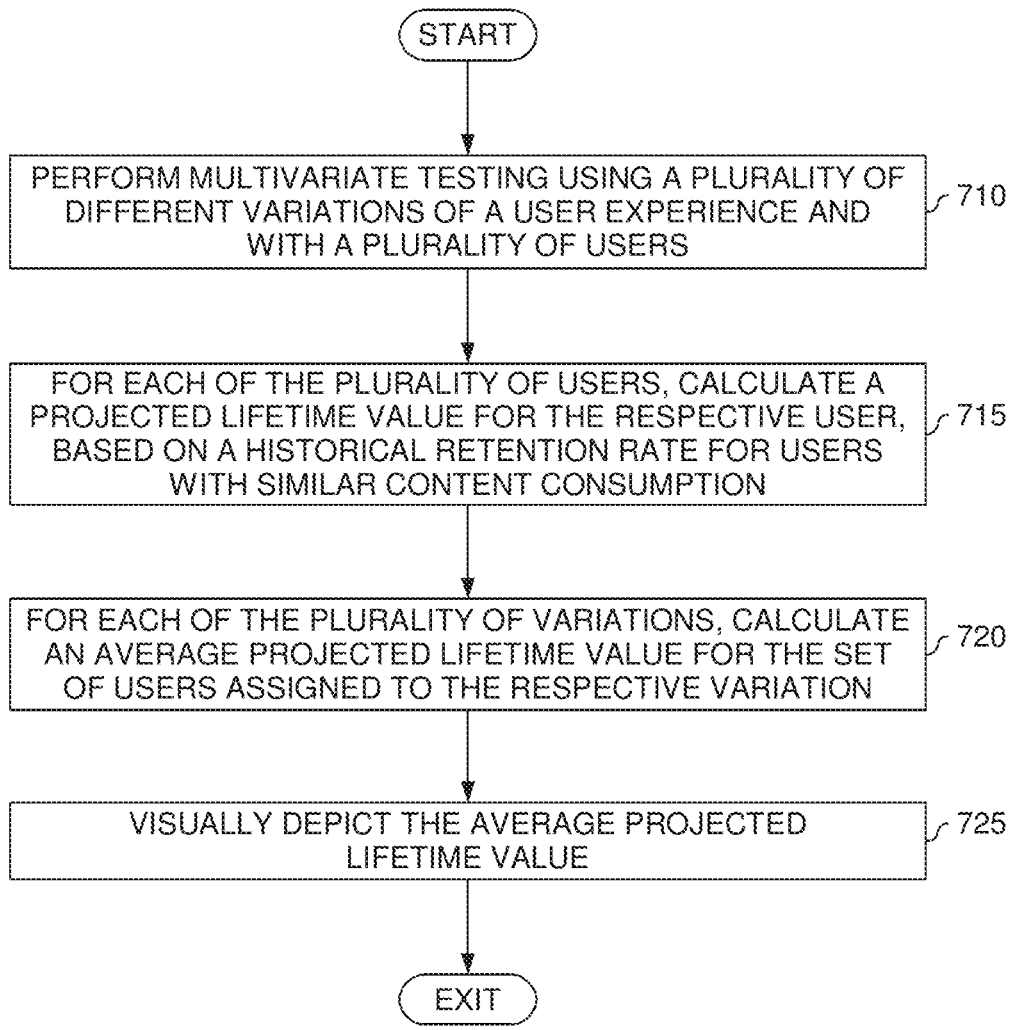
FIG. 7 is a flow diagram illustrating a method for analyzing multivariate testing results using a projected lifetime value metric, according to one embodiment described herein.

In one embodiment, the multivariate testing component 350 is configured to use an average projected lifetime value metric, in evaluating variations of a user experience as part of a multivariate test. An example of this is shown in FIG. 7, which is a flow diagram illustrating a method for analyzing multivariate testing results using a projected lifetime value metric, according to one embodiment described herein. As shown, the method 700 begins at block 710, where the multivariate testing component 350 performs a multivariate test using a plurality of different variations and a plurality of users. For example, the multivariate test could be performed using the method 500 shown in FIG. 5 and discussed above.

The multivariate testing component 350 then calculates a respective projected lifetime value for each of the plurality of users involved in the test (block 715). In the depicted embodiment, the multivariate testing component 350 is configured to calculate the projected lifetime value for a particular user, based on historical retention rate for users generally on the content site, having similar content consumption to the particular user. For example, assume that a particular user consumed 10 hours of streaming content during the test window of time. The multivariate testing component 350 could then access historical data collected from users generally on the online site (i.e., as opposed from only the users involved in the multivariate test) and could determine a projected lifetime value for the particular user, by determining a historical retention rate over one or more periods of time for users consuming 10 hours of streaming content over a similar period of time.

Upon calculating the projected lifetime values for each of the users involved in the multivariate test, the multivariate testing component 350 then calculates an average projected lifetime value for each of the plurality of variations (block 720). For instance, the multivariate testing component 350 could calculate the average projected lifetime value for a particular variation by computing the average projected lifetime values across all of the users assigned the particular variation during the test. The multivariate testing component 350 then visually depicts the average projected lifetime values for each of the variations (block 725), and the method 700 ends. Advantageously, doing so enables a test administrator (e.g., a developer of the subscription-based online site) to evaluate the plurality of variations relative to each other, and to determine which of the variations had the greatest positive impact on the average projected lifetime value metric for users of the online site.

Figure 8:
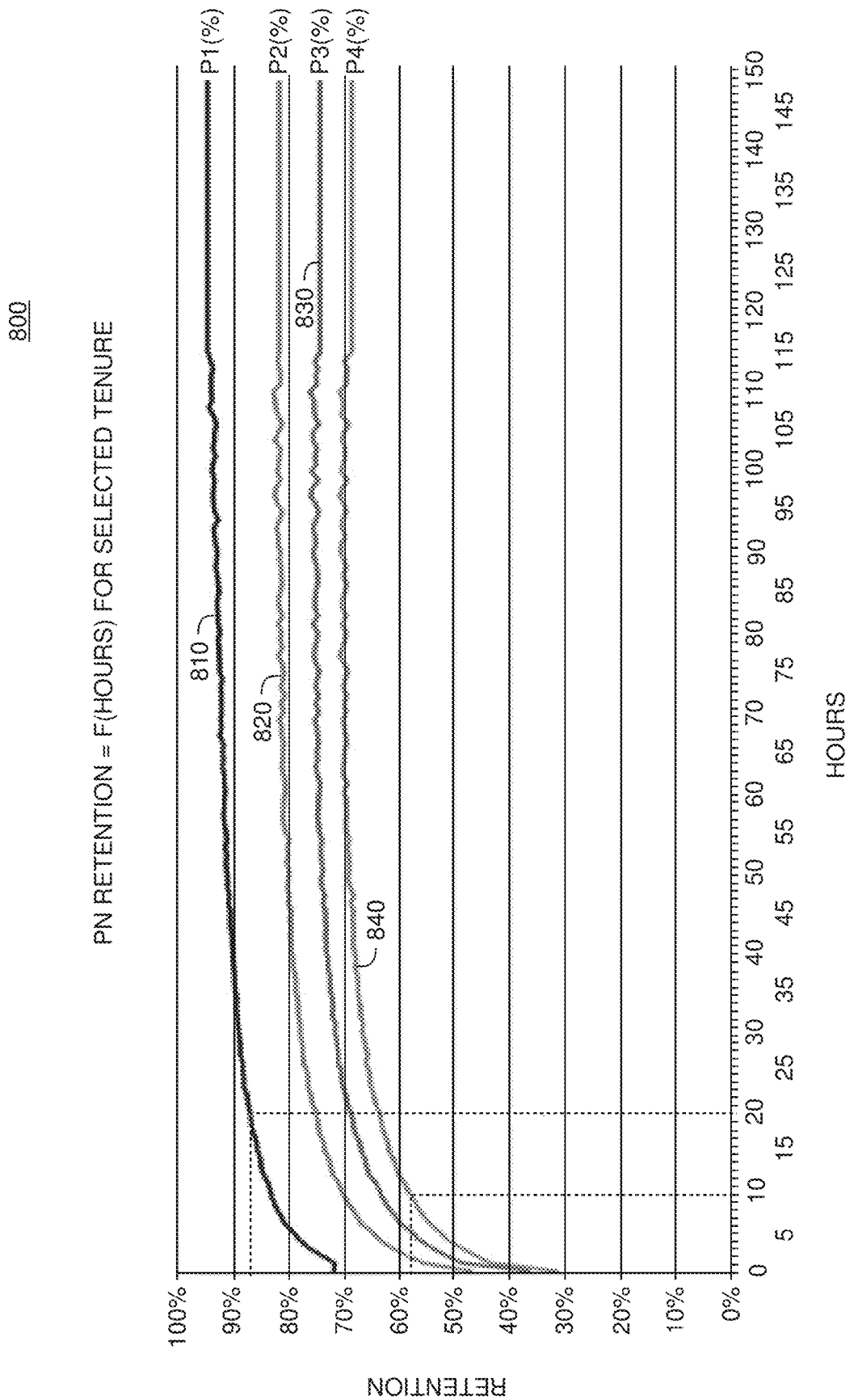
FIG. 8 illustrates a graph of retention curves over segments of time, according to one embodiment described herein.

FIG. 8 illustrates a graph of retention curves over segments of time, according to one embodiment described herein. As shown, the graph 800 includes a P1 curve 810, a P2 curve 820, a P3 curve 830 and a P4 curve 840. Generally, P1 represents a first window of time (e.g., 1 week), P2 represents a second window of time that includes the first window of time (e.g., weeks 1 and 2), P3 represents a third window of time that includes both the first and second windows of time (e.g., weeks 1, 2 and 3) and P4 represents a fourth window of time that includes the first, second and third windows of time (e.g., weeks 1, 2, 3 and 4). The multivariate testing component 350 could be configured to use such a graph 800 in calculating the projected lifetime value of a given user. For instance, assume a particular user consumes 10 hours of streaming content over a week-long multivariate test. The multivariate testing component 350 could access the graph 800 and could determine a respective projected retention rate for the user, for each of P1, P2, P3 and P4. The multivariate testing component 350 could then use these projected retention rates to determine the projected lifetime value of the user.

FIG. 9 is a screenshot illustrating the results of a multivariate test using a projected lifetime value metric, according to one embodiment described herein. As shown, the interface 900 includes an overall retention rate 910 for each of the variations "0" through "8", an average projected lifetime value 920 for each of the variations, and a plurality of segments 930 with corresponding percentages for each of the variations. In the depicted interface 900, the multivariate testing component 350 has highlighted a number of statistically significant percentages 935. Here, the multivariate testing component 350 is configured to use the test cell with ID 0 as the baseline user experience, and the multivariate testing component 350 has determined the statistically significant percentages 935 by identifying percentages that are higher than the corresponding percentage for the baseline user experience by at least a minimum amount. Additionally, the multivariate testing component 350 has restricted the statistically significant percentages 935 to only those percentages whose p-value is less than a predetermined threshold amount. Advantageously, doing so allows a test administrator to quickly and efficiently analyze the results of the multivariate test, and to determine which variations had the greatest influence on user consumption.

Additionally, in the depicted embodiment, the multivariate testing component 350 has identified statistically significant average lifetime value scores 925 for two of the tested variations. Similar to the statistically significant percentage values 935, the multivariate testing component 350 has identified the statistically significant average lifetime value scores 925 by determining which average lifetime value scores exceed the baseline lifetime value score (i.e., 9.89 in the depicted example) by at least a certain amount, and that have a p-value less than a predetermined threshold amount. Advantageously, doing so allows test administrators to quickly and efficiently analyze the test results and to determine that, in this example, variations 3 and 5 had the greatest impact on the users' average lifetime value, with variation 3 having the greatest impact overall. Such information could then be used to improve the online site, e.g., by permanently incorporating variation 3 or a substantially similar variation into the online site.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A method of testing a plurality of variations of a user experience on a subscription-based online site, wherein each of the plurality of variations is distinct from other variations in the plurality of variations, comprising:
   assigning each of a plurality of users to one of the plurality of variations of the user experience;
   for each of a plurality of user requests received from the plurality of users during a predetermined window of time:
      determining one of the plurality of variations for use in processing the user request, based on a user associated with the user request, and
      processing the respective user request using the determined variation; and
   determining long-term user metric information relating to subscription services for the subscription-based online site, with respect to the plurality of users, and for each of the plurality of variations.

2. The method of claim 1, wherein the determined user metric information comprises user retention information, determined based on at least one of (i) whether each of the plurality of users remains a subscriber to the subscription-based online site at the conclusion of the predetermined window of time and (ii) whether each of the plurality of users has altered a subscription plan to the subscription-based online site at the conclusion of the predetermined window of time.

3. The method of claim 1, further comprising:
   identifying a plurality of variables to evaluate; and
   generating the plurality of variations based on the plurality of variables, wherein each of the plurality of variations comprises a distinct permutation of the variables in the plurality of variables.

4. The method of claim 1, wherein one of the plurality of variations comprises, relative to the other variations in the plurality of variations, at least one of (i) a distinct interface element, (ii) a distinct interface arrangement, (iii) a distinct algorithm used by the online site.

5. The method of claim 1, further comprising:
   segmenting the plurality of users into a plurality of subgroups, based on a respective content consumption amount, for each of the plurality of users, with respect to the subscription-based online site, and
   wherein determining long-term user metric information relating to subscription services for the subscription-based online site further comprises, for each of the plurality of variations:

determining, for each of the plurality of sub-groups, a respective sub-group rating for the respective variation.

6. The method of claim 5, further comprising:
for each of the determined sub-group ratings, determining a respective p-value indicative of a probability of obtaining a second sub-group rating at least as high as the determined sub-group rating; and
determining one or more of the sub-group ratings to be statistically significant, based on a determination that the respective p-values for the one or more sub-group ratings are less than a predetermined threshold value.

7. The method of claim 1, wherein determining long-term user metric information relating to subscription services for the subscription-based online site further comprises:
for each of the plurality of users, determining a respective projected lifetime value for the user; and
determining an average projected lifetime value for each of the plurality of variations, based on the determined projected lifetime values for each of the plurality of users, and further based on the users assigned to each of the plurality of variations.

8. The method of claim 7, wherein determining the respective projected lifetimes value for each of the plurality of users is based on historical retention data collected from users of the subscription-based online site.

9. A non-transitory computer-readable medium containing a program that, when executed, performs an operation for testing a plurality of variations of a user experience on a subscription-based online site, wherein each of the plurality of variations is distinct from other variations in the plurality of variations, comprising:
assigning each of a plurality of users to one of the plurality of variations of the user experience;
for each of a plurality of user requests received from the plurality of users during a predetermined window of time:
determining one of the plurality of variations for use in processing the user request, based on a user associated with the user request; and
processing the respective user request using the determined variation; and
determining long-term user metric information relating to subscription services for the subscription-based online site, with respect to the plurality of users, and for each of the plurality of variations.

10. The non-transitory computer-readable medium of claim 9, wherein the determined user metric information comprises user retention information, determined based on at least one of (i) whether each of the plurality of users remains a subscriber to the subscription-based online site at the conclusion of the predetermined window of time and (ii) whether each of the plurality of users has altered a subscription plan to the subscription-based online site at the conclusion of the predetermined window of time.

11. The non-transitory computer-readable medium of claim 9, the operation further comprising:
identifying a plurality of variables to evaluate; and
generating the plurality of variations based on the plurality of variables, wherein each of the plurality of variations comprises a distinct permutation of the variables in the plurality of variables.

12. The non-transitory computer-readable medium of claim 9, wherein one of the plurality of variations comprises, relative to the other variations in the plurality of variations, at least one of (i) a distinct interface element, (ii) a distinct interface arrangement, (iii) a distinct algorithm used by the online site.

13. The non-transitory computer-readable medium of claim 9, the operation further comprising:
segmenting the plurality of users into a plurality of sub-groups, based on a respective content consumption amount, for each of the plurality of users, with respect to the subscription-based online site, and
wherein determining long-term user metric information relating to subscription services for the subscription-based online site further comprises, for each of the plurality of variations:
determining, for each of the plurality of sub-groups, a respective sub-group rating for the respective variation.

14. The non-transitory computer-readable medium of claim 13, the operation further comprising:
for each of the determined sub-group ratings, determining a respective p-value indicative of a probability of obtaining a second sub-group rating at least as high as the determined sub-group rating; and
determining one or more of the sub-group ratings to be statistically significant, based on a determination that the respective p-values for the one or more sub-group ratings are less than a predetermined threshold value.

15. The non-transitory computer-readable medium of claim 9, wherein determining long-term user metric information relating to subscription services for the subscription-based online site further comprises:
for each of the plurality of users, determining a respective projected lifetime value for the user; and
determining an average projected lifetime value for each of the plurality of variations, based on the determined projected lifetime values for each of the plurality of users, and further based on the users assigned to each of the plurality of variations.

16. The non-transitory computer-readable medium of claim 15, wherein determining the respective projected lifetimes value for each of the plurality of users is based on historical retention data collected from users of the subscription-based online site.

17. A system, comprising:
a processor; and
a memory containing a program that, when executed by the processor, performs an operation for testing a plurality of variations of a user experience on a subscription-based online site, wherein each of the plurality of variations is distinct from other variations in the plurality of variations, the operation comprising:
assigning each of a plurality of users to one of the plurality of variations of the user experience;
for each of a plurality of user requests received from the plurality of users during a predetermined window of time:
determining one of the plurality of variations for use in processing the user request, based on a user associated with the user request; and
processing the respective user request using the determined variation; and
determining long-term user metric information relating to subscription services for the subscription-based online site, with respect to the plurality of users, and for each of the plurality of variations.

18. The system of claim 17, wherein the determined user metric information comprises user retention information, determined based on at least one of (i) whether each of the plurality of users remains a subscriber to the subscription-based online site at the conclusion of the predetermined window of time and (ii) whether each of the plurality of users has altered a subscription plan to the subscription-based online site at the conclusion of the predetermined window of time.

19. The system of claim 17, the operation further comprising:
   identifying a plurality of variables to evaluate; and
   generating the plurality of variations based on the plurality of variables, wherein each of the plurality of variations comprises a distinct permutation of the variables in the plurality of variables.

20. The system of claim 17, wherein one of the plurality of variations comprises, relative to the other variations in the plurality of variations, at least one of (i) a distinct interface element, (ii) a distinct interface arrangement, (iii) a distinct algorithm used by the online site.

21. The system of claim 17, the operation further comprising:
   segmenting the plurality of users into a plurality of sub-groups, based on a respective content consumption amount, for each of the plurality of users, with respect to the subscription-based online site, and
   wherein determining long-term user metric information relating to subscription services for the subscription-based online site further comprises, for each of the plurality of variations:
      determining, for each of the plurality of sub-groups, a respective sub-group rating for the respective variation.

22. The system of claim 21, the operation further comprising:
   for each of the determined sub-group ratings, determining a respective p-value indicative of a probability of obtaining a second sub-group rating at least as high as the determined sub-group rating; and
   determining one or more of the sub-group ratings to be statistically significant, based on a determination that the respective p-values for the one or more sub-group ratings are less than a predetermined threshold value.

23. The system of claim 17, wherein determining long-term user metric information relating to subscription services for the subscription-based online site further comprises:
   for each of the plurality of users, determining a respective projected lifetime value for the user; and
   determining an average projected lifetime value for each of the plurality of variations, based on the determined projected lifetime values for each of the plurality of users, and further based on the users assigned to each of the plurality of variations.

24. The system of claim 23, wherein determining the respective projected lifetimes value for each of the plurality of users is based on historical retention data collected from users of the subscription-based online site.

* * * * *